US007826376B1

United States Patent
Kritov et al.

(10) Patent No.: US 7,826,376 B1
(45) Date of Patent: Nov. 2, 2010

(54) DETECTION OF NETWORK PROBLEMS IN A COMPUTING SYSTEM

(75) Inventors: Slava Kritov, Palo Alto, CA (US); Hans F. van Rietschote, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 643 days.

(21) Appl. No.: 11/042,641

(22) Filed: Jan. 25, 2005

(51) Int. Cl.
*G01R 31/08* (2006.01)
*H04J 3/06* (2006.01)
*H04L 12/50* (2006.01)
*G06F 13/42* (2006.01)

(52) U.S. Cl. .................. 370/241; 370/252; 370/384; 370/503; 370/516; 370/517; 370/518; 370/519; 340/825

(58) Field of Classification Search ............. 370/519, 370/518, 517, 516, 503, 241, 252, 384; 340/825.2
See application file for complete search history.

(56) References Cited

U.S. PATENT DOCUMENTS

| | | | |
|---|---|---|---|
| 6,182,249 B1 | 1/2001 | Wookey et al. | 714/47 |
| 6,889,058 B2 * | 5/2005 | Tordera | 455/557 |
| 6,928,473 B1 * | 8/2005 | Sundaram et al. | 709/224 |
| 2002/0120727 A1 * | 8/2002 | Curley et al. | 709/223 |
| 2003/0152041 A1 * | 8/2003 | Herrmann et al. | 370/310 |
| 2004/0001493 A1 * | 1/2004 | Cloonan et al. | 370/395.42 |
| 2004/0010487 A1 * | 1/2004 | Prahlad et al. | 707/1 |
| 2004/0010595 A1 * | 1/2004 | Hiranaka | 709/227 |
| 2007/0100473 A1 * | 5/2007 | Shvodian et al. | 700/19 |
| 2007/0136480 A1 * | 6/2007 | Stephenson et al. | 709/227 |

OTHER PUBLICATIONS

Mathis, M., Heffner, J., and Reddy, R., "Web100: Extended TCP Instrumentation for Research, Education and Diagnosis", ACM Computer Communications Review, vol. 33, No. 3, Jul. 2003.

* cited by examiner

*Primary Examiner*—Daniel J Ryman
*Assistant Examiner*—John Blanton
(74) *Attorney, Agent, or Firm*—Rory D. Rankin; Meyertons, Hood, Kivlin, Kowert & Goetzel, P.C.

(57) ABSTRACT

A method and mechanism for monitoring performance in a network computing system. A user application on a source system is configured to communication with a destination system. The application is configured to load a dynamic linked library upon execution. The dynamic linked library is configured to store packet identifiers and time stamp information for communication packets received from the application prior to the packets being conveyed to the destination system. Upon receipt of an acknowledgement packet from the destination system, the library code is configured to retrieve the previously stored time stamp information, determine transit latency information corresponding to the communication packet, and log the determined transit latency information. Acknowledgement packets may further include time stamp information which may be utilized to determine additional latency information corresponding to the communication packet and/or acknowledgement packet. Logged information may be used to distinguish application problems from network performance problems.

20 Claims, 7 Drawing Sheets

DETECTION OF NETWORK PROBLEMS IN A COMPUTING SYSTEM

BACKGROUND OF THE INVENTION

1. Field of the Invention

The invention relates to computing systems and, more particularly, to detecting problems in network communications.

2. Description of the Related Art

In recent years, organizations have become increasingly dependent upon the proper operation of both computer hardware and software. Many business organizations and governmental entities rely upon applications that access large amounts of data, often exceeding a terabyte or more of data, for mission-critical applications. Many of these applications require near-continuous access to data. For example, many systems such as retail processing databases, airline reservation databases, and financial institution databases must be available to perform transaction processing 24 hours a day. Because of their dependence upon the proper operation of these applications, downtime associated with such systems can be disastrous. Accordingly, it is critical that the cause of an application failure or a system aberration be quickly identified and remedied.

While efforts may be made to quickly identify problems with a particular application, diagnosing the causes of such problems can be very difficult. Typically, a system administrator may be required to study logs to determine the past history and generally engage in a root cause analysis (RCA). However, as may be appreciated, such an approach may be very time consuming and relatively inefficient.

Because organizations typically utilize a wide variety of applications and components which are provided by third parties, such organizations frequently depend upon support from those third parties. Third party vendors frequently have support personnel who may be reached via telephone who are trained to assist customers with problems. While such customer support may serve as a benefit to customers, vendor support personnel may find their time is consumed by matters which do not involve the vendor's products.

Often times it is difficult to ascertain where a problem within a system originates. Consequently, what may appear to be a problem with a particular product, turns out to be a problem with another product or component elsewhere in the system. For example, in a system which includes network communication, a customer may believe there is a problem with a locally installed application when in fact there is a problem with the network communications. However, believing it to be a problem with the particular application, the customer may call the vendor of the application in order to obtain technical support. The vendor support personnel may then spend a significant amount of time trying to determine the cause of the customer's problem. After some time it may be determined the cause of the problem is not with the vendor product and the customer should seek support elsewhere. Unfortunately, time and money has already been spent by the vendor on a problem which is unrelated to their product. In addition, resolution of the customer's problem has been delayed as well.

In addition, in analyzing network performance, traditional approaches typically rely on network management or diagnostic tools which take measurements with passive or active network elements. For example, observations of existing connections may be made from the middle of the network, "sniffing" may be used to measure the health of a particular connection, or dedicated diagnostic tests may be run end-to-end. However, each of these approaches may impact system performance, may require modification of operating system or application code, or are otherwise unsuitable for use in real-time support situations.

Accordingly, an effective method and mechanism for diagnosing system problems is desired.

SUMMARY OF THE INVENTION

A method and mechanism are contemplated to monitor network performance in a computing system.

In one embodiment, a computing system includes a source system coupled to a destination system via a network infrastructure. The source system includes a user application which is configured to communication with the destination system. The user application is configured to load a user space dynamic linked library upon execution which performs function to facilitate monitoring of network performance. The library includes code which detects communications initiated by the application and stores packet identifiers and time stamp information for communication packets received from the application. Subsequently, the communication packets are conveyed to the destination system. Responsive to receiving the communication packets, the destination system generates acknowledgement packets which correspond to the received communication packets. Upon receipt of an acknowledgement packet from the destination system, the library code is configured to retrieve the previously stored time stamp information, determine transit latency information corresponding to the communication packet, and log the determined transit latency information.

In one embodiment, the destination system is configured to store time stamp information within acknowledgement packets. Time stamp information stored within an acknowledgement packet may indicate the time the acknowledgement packet was generated, the time the acknowledgement packet as sent by the destination system, and/or the time the original communication packet was received by the destination system. The time stamp information included within the acknowledgement packet may be utilized to determine additional latency information corresponding to the communication packet and/or acknowledgement packet. Network performance and latency information which has been logged may be used to distinguish application problems from network performance problems.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
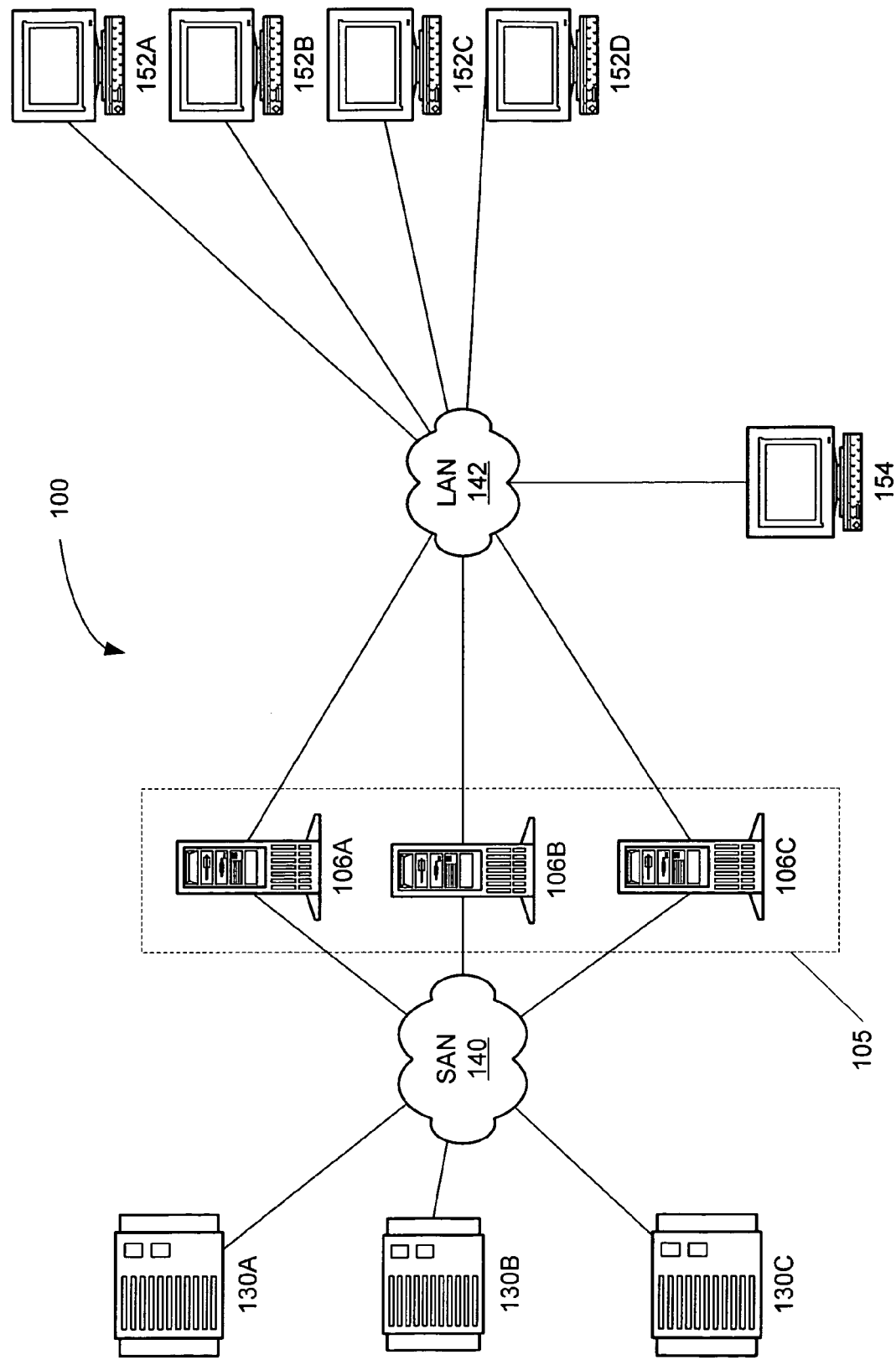
FIG. 1 illustrates one embodiment of a computing system.

FIG. 1 illustrates one embodiment of a computing system which may incorporate the methods and mechanisms described herein. FIG. 1 shows one embodiment of a computing cluster, SAN, and LAN in a computer network 100. In the example shown, servers 106A-106C form a cluster 105. Together with data storage devices 130A-130C and SAN interconnect 140, servers 106 form a SAN. Elements referred to herein with a particular reference number followed by a letter will be collectively referred to by the reference number alone. For example, servers 106A-106C will be collectively referred to as servers 106. Servers 106 have direct access to any of the storage devices 130 which are connected to the SAN interconnect 140. SAN interconnect 140 is typically a high speed interconnect, such as Fibre Channel. As already noted, the servers and storage devices comprise a network in and of themselves. In the SAN, no server is dedicated to a particular storage device as in a LAN. Any server 106 may access any storage device 130 on the storage area network. Representative characteristics of a SAN may include a 200 MB/sec bandwidth, up to 126 nodes per loop, a connection distance of 50 kilometers, and a storage capacity of 9572 gigabytes. Consequently, the performance, flexibility, and scalability of a SAN may be significantly greater than that of a typical SCSI based system.

Also included in the network 100 of FIG. 1 are workstations 152 and LAN interconnect 142. As shown in FIG. 1, LAN 142 is coupled to cluster 105. Because each storage device 130 may be independently and directly accessed by any server 106, overall data throughput between the LAN and SAN may be much greater than that of the traditional client-server LAN. For example, if workstations 152A and 152C both submit access requests to storage 130, two of servers 106 may service these requests concurrently. Alternatively, one of servers 106 may be configured as a failover server. In the event one of the servers 106 fails, another may become active in order to prevent service interruption or downtime.

In addition to workstations 152, FIG. 1 also depicts an administrator workstation 154 which may be used by a system administrator to configure and monitor operation of various hardware and software components in the network 100. In one embodiment, as discussed above, workstation 154 is configured to monitor memory usage of applications executing on each of workstations 152, cluster 105, and elsewhere within the system 100. As already noted, numerous such network configurations are possible and are contemplated.

Figure 2:
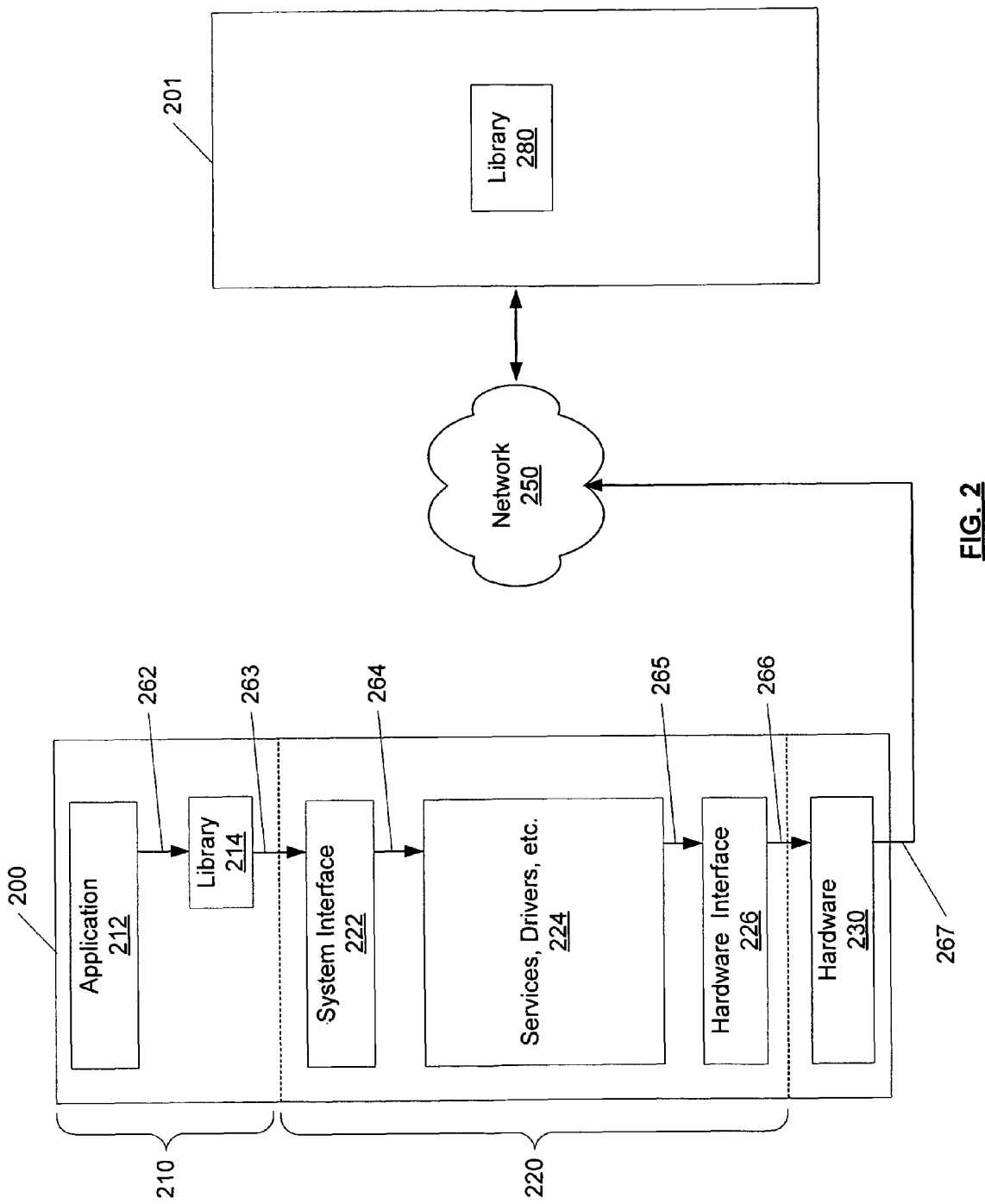
FIG. 2 illustrates one embodiment of a networked computing system.

Turning now to FIG. 2, one embodiment of a system configured to monitor network and communications is illustrated. Depicted in the example is a first system 200 coupled via a network 250 to a second system 201. Generally speaking, each of systems 200 and 201 may comprise a client, server, or other computing device configured to communicate via a network. An abstracted view of system 200 shows various hardware and software components, with the software components operating within either a user space 210 or a kernel space 220. In one embodiment, each of the systems 200 and 201 are configured to support communications using the Transmission Control Protocol/Internet Protocol (TCP/IP). Alternative embodiments may support other communication protocols in addition to TCP/IP or instead of TCP/IP.

In the example shown, the user space 210 includes an application 212 and library 214. Generally speaking, while multiple applications and libraries may be included, only a single application 212 and library 214 are shown for ease of discussion. In one embodiment, library 214 comprises a dynamically linked library (DLL) which includes code to support network communications. In one embodiment, library 214 may be loaded prior to a communication socket library on a per process basis. For example, library 214 may provide an Application Programming Interface (API) for accessing communication services provided by the operating system. System 201 includes a library 280 which includes code configured to support network communications. In one embodiment, library 280 also comprises user space code. While the term "library" is used herein to refer to software components 214 and 280, this term is not intended to restrict either of the libraries to a particular type of software component. For example, as described above, library 214 may be a DLL. However, the functions performed by the code within the library may be performed by code within the application 212 itself, in a different software component, or elsewhere.

Kernel space 220 includes a system interface 222, services 224, and hardware interface 226. System interface 222 provides an interface between the operating system services 224 and application code within the user space 210. Services 224 generally includes protocol stacks, drivers, and other facilities commonly found in an operating system. Hardware interface 226 includes code which provides an interface between the operating system and the system hardware components. It is to be understood that the depiction of various software components in FIG. 2 is intended to be exemplary only. Those skilled in the art will appreciate that there are numerous ways in which operating system components and layers may be depicted.

As discussed above, it is not uncommon for a user/customer to detect a problem with their system and seek vendor assistance. For example, assume application 212 comprises program code to perform a backup of data to a remotely located storage device. For purposes of discussion, assume system 201 comprises the remote storage device. If the user begins a backup procedure utilizing application 212 and the procedure is taking an inordinately long period of time to complete, the user may believe there is a problem with the application 212 itself. The user may then contact the vendor of the application 212 to seek support. However, rather than the problem being with the application 212, there may be a problem with network communications. For example, there could be a network configuration problem within system 200, network infrastructure 250, or system 201. Consequently, the application vendor is called upon to diagnose a vendor application 212 problem that does not exist. Because the vendor does not have available the information or tools necessary to quickly determine there is a problem with the network rather than the application 212, much vendor time may be wasted. Further, discovery of the user's real problem may be delayed.

As noted above, traditional approaches to network management and diagnosis may rely on tools which take measurements with passive or active network elements. For example, observations of existing connections may be made from the middle of the network, "sniffing" may be used to measure the health of a particular connection, or dedicated diagnostic tests may be run end-to-end. However, each of these approaches may impact system performance, may require modification of operating system or application code, or are otherwise unsuitable for use in real-time support situations. As may be appreciated, support for TCP/IP generally entails incorporating specific program code to support TCP/

IP within at least the operating system code of a computing system. Consequently, making any changes to the communications protocol may generally necessitate making changes to the operating system code. While modifying the operating system code may enable modification of the communication protocols, such an approach can be difficult and may result in unintended side effects. Consequently, an alternative approach may be desired.

In the embodiment of FIG. 2, the depicted system is configured to support the diagnosis of network problems. In the embodiment shown, application code is included which enables tracking of communication protocol (e.g., TCP/IP) state limiters which may enable application-related performance degradation to be distinguished from network-caused effects. Generally speaking, communication protocol frames/packets are modified (or inserted) which support diagnosis of network problems such as congestion, sender problems, or receiver problems. In one embodiment, frames with highly granular timestamps are included in the communication stream. The actual round trip time on these frames may then provide necessary statistics. In one embodiment, clock drifts may also be taken into account. As used herein, "frames" and/or "packets" may be used interchangeably to refer to the various subunits of a communication stream. Generally speaking, such subunits will include at least (i) an identifier for use in distinguishing subunits from one another; and (ii) a request, response, or diagnostic data as appropriate.

In one embodiment, each communication endpoint is configured to support the above described time stamped frames. In the example of FIG. 2, code to support the frame management is included in libraries 214 and 280. For example, application 212 may correspond to a backup application and library 280 may correspond to an agent or other code associated with the backup application. Communications between these endpoints may then be monitored. In one embodiment, libraries 214 and 280 comprise user space code. Accordingly, no changes to operating system code to support the monitoring system are required. Further, no external active agents (e.g., "sniffers") along the communication path are required. As an example, application 212 may convey a communication 262 to system 201. The communication 262 is received by library 214 which modifies one or more of the communication 262 frames to include a time stamp. The modified communication frames 263 then proceed through the system (264, 265, 266, and 267) through network 250 to the system 201. In response to receiving the communication frames, library 280 may then respond with an acknowledgement (ACK, not shown). Depending upon the embodiment, the ACK may or may not include a time stamp itself. Upon receipt of the ACK, library 214 may then determine various aspects of the frame delivery times by reference to the time stamp(s) and time of receipt of frames. It is noted that library 280 may similarly determine various aspects of the frame transit times.

For example, if the original request 263 includes a time stamp and the corresponding ACK does not, then library 214 may determine the total roundtrip transit time for the request and responsive ACK by comparing the original time stamp to the time the ACK was received. If the ACK also includes a time stamp, then the transit time of both the request and the ACK may be determined as well. In this manner, statistics corresponding to the network communications may be maintained and logged. If network performance falls below a predetermined threshold, a warning may be generated and/or logged as well. Based upon the content of these logs and/or warnings, a customer may determine that a problem exists with the network communication rather than the vendor product and the vendor may not be called upon. Alternatively, if the vendor is called upon, the vendor may quickly eliminate the vendor's product as the source of the problem by examining the application logs. In either case, less vendor time is consumed in dealing with a non-vendor problem and the user/customer may be provided information which assists them in identifying the problem. In addition to the above, statistics may be maintained on a per connection and/or per client basis. Such information may further assist in isolating the cause of a problem.

In the above discussion, statistics are gathered based upon actual, in production, communications. However, one or both of libraries 214, 280 may also be configured to support the generation of diagnostic frames. Such an approach may be useful in a case where the production environment does not produce enough frames on its own to generate useful statistics. Running a diagnostic procedure which generates and monitors diagnostic frames may be initiated by either a user or a vendor.

Figure 3:
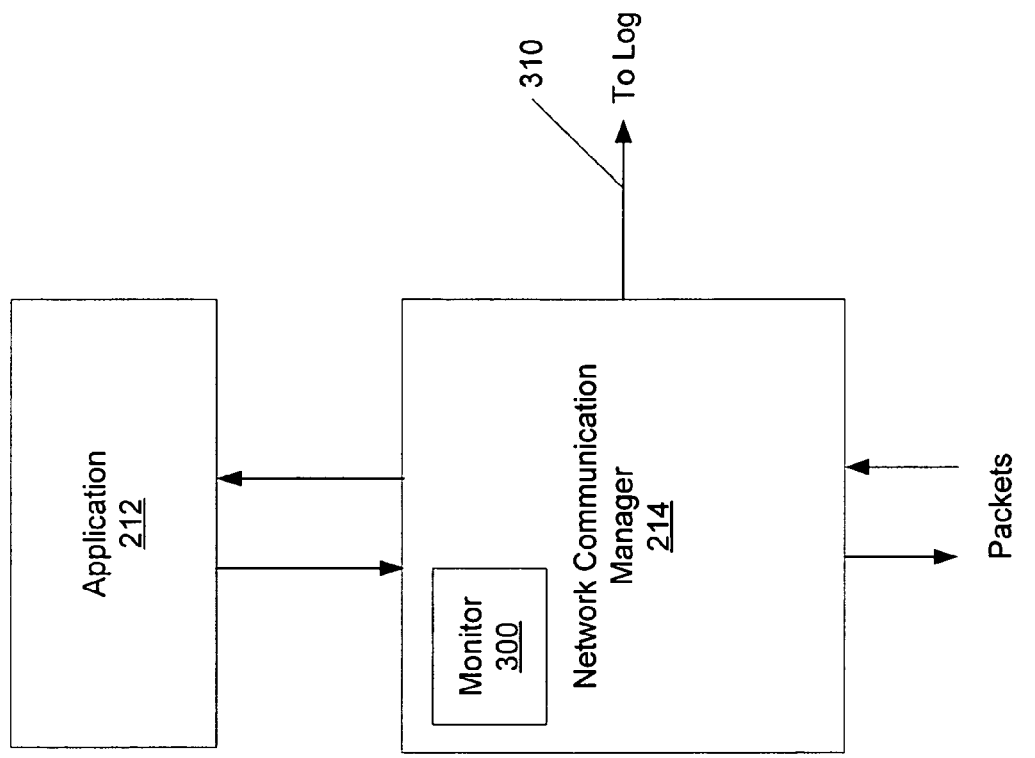
FIG. 3 depicts one embodiment of an application and network performance monitoring code.

FIG. 3 depicts the application 212 and library 214 shown in FIG. 2. In the example shown, library 214 is entitled Network Communication Manager and includes code 300 configured to modify communication frames/packets by adding time stamp information, monitor frame transit times, and log statistics as described above. Also illustrated is the generation of log data 310 corresponding to the gathered communication statistics. Log data 310 may be stored locally or remotely as desired.

Figure 4:
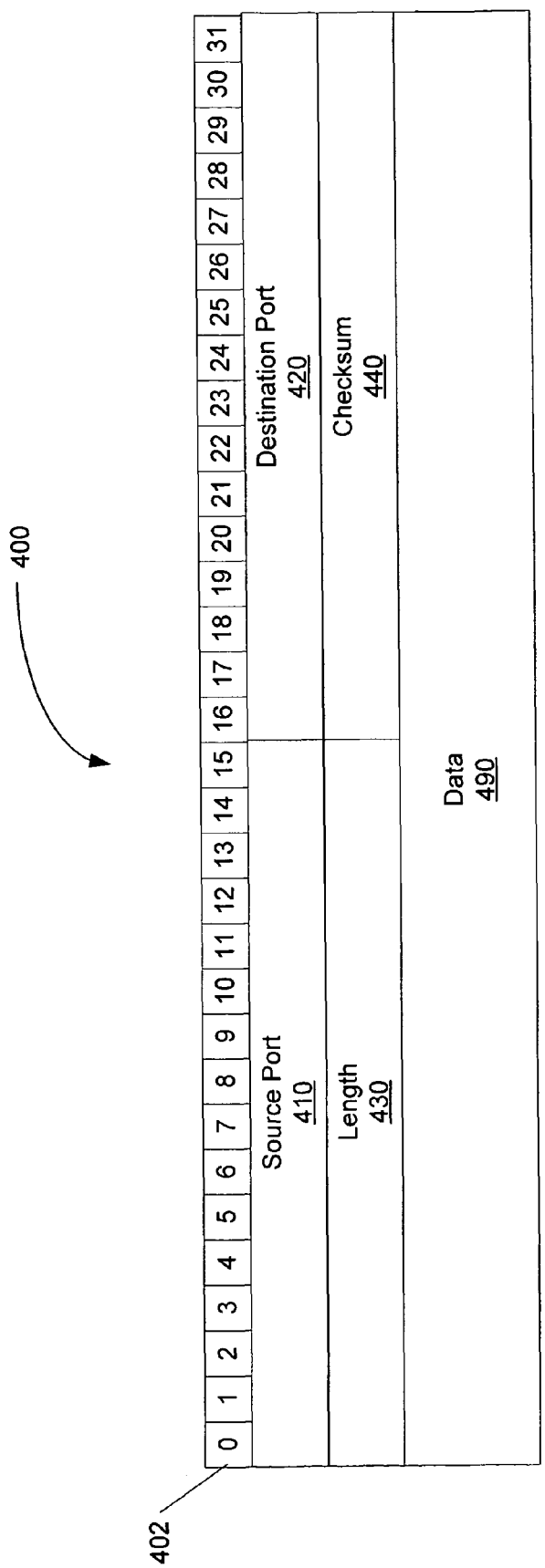
FIG. 4 illustrates one embodiment of a communication packet.

FIG. 4 illustrates one example of a packet 400 which may be used in the described system. Row 402 is included merely to indicate bit positions within the packet. As seen in FIG. 4, packet 400 includes a source port 410, destination port 420, length 430, checksum 440 and data 490. Source port 410, destination port 420, length 430, and checksum 440 are generally referred to as a header. Data 490 may generally be referred to as a datagram. It is noted that the fields and content depicted in FIG. 4 are exemplary only. Other embodiments may include packets with different formats and content. Numerous configurations are possible and are contemplated.

Various protocols may specify minimum packet sizes. One example of a protocol which may require a minimum packet size is the Ethernet protocol. In a typical implementation, an Ethernet configuration may require a minimum packet size of 64 bytes. This minimum size is related to the nature of the protocol itself. If the packet size were too small, a workstation may begin transmitting a new packet before a collision has been detected. Consequently, the minimum packet size is chosen such that the transmission of a packet takes a sufficiently length of time to enable a sender to detect a collision a know a resend of the packet is required. Other protocols may set minimum packet sizes for other reasons.

Because a particular protocol may require a minimum packet size, the packet 400 illustrated in FIG. 4 may be padded with garbage, or null, data in the data field 490 to fill out the size of the packet. Taking advantage of these null payloads, a mechanism for adding information to packets and monitoring packets as described above may be achieved.

Figure 5:
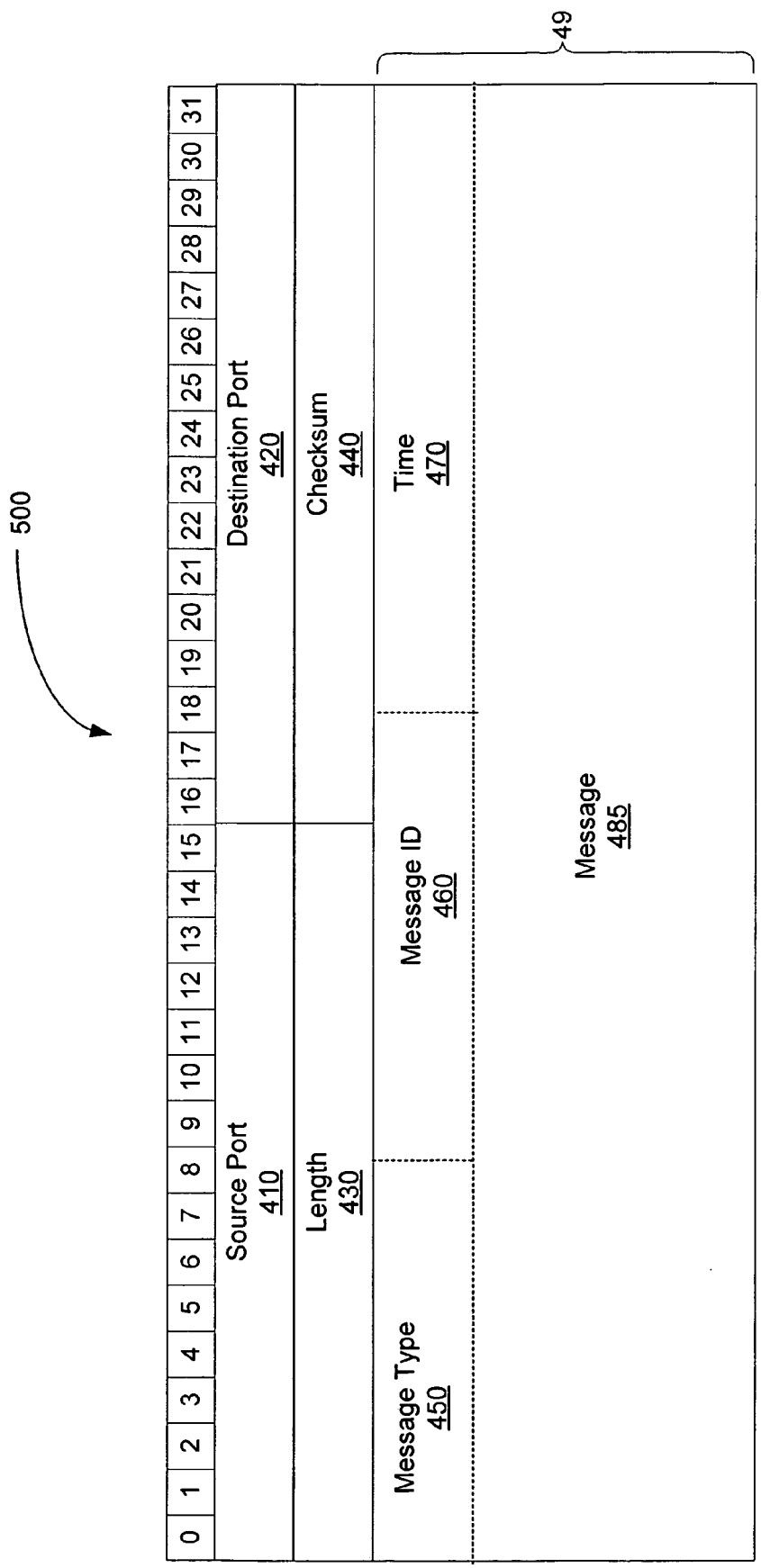
FIG. 5 depicts one embodiment of a modified communication packet.

FIG. 5 illustrates one embodiment of a packet 500 which has been modified to support inter-node messaging. While numerous packet configurations are possible, the type of packet as illustrated in FIG. 4 utilized for purposes of discussion. Packet 500 includes both header (410, 420, 430, 440) and data 490 sections as before. However, data section 490 has been modified to include additional identifiable information. In the embodiment shown, data section 490 includes subsections indicating a message type 450, message identifier 460, message length 470, sequence number 480, and inter-node message 485. Message type 450 may be used to indicate an inter-node message is present and/or the particular type of inter-node message. Message ID 460 may be used to uniquely identify, and distinguish, messages from one another. The Time field 470 may be used for storing a timestamp. Subsections 450, 460, and 470 may be considered a pseudo-header for the monitoring system. Finally, the message section 485 is configured to store original packet data.

Figure 6:
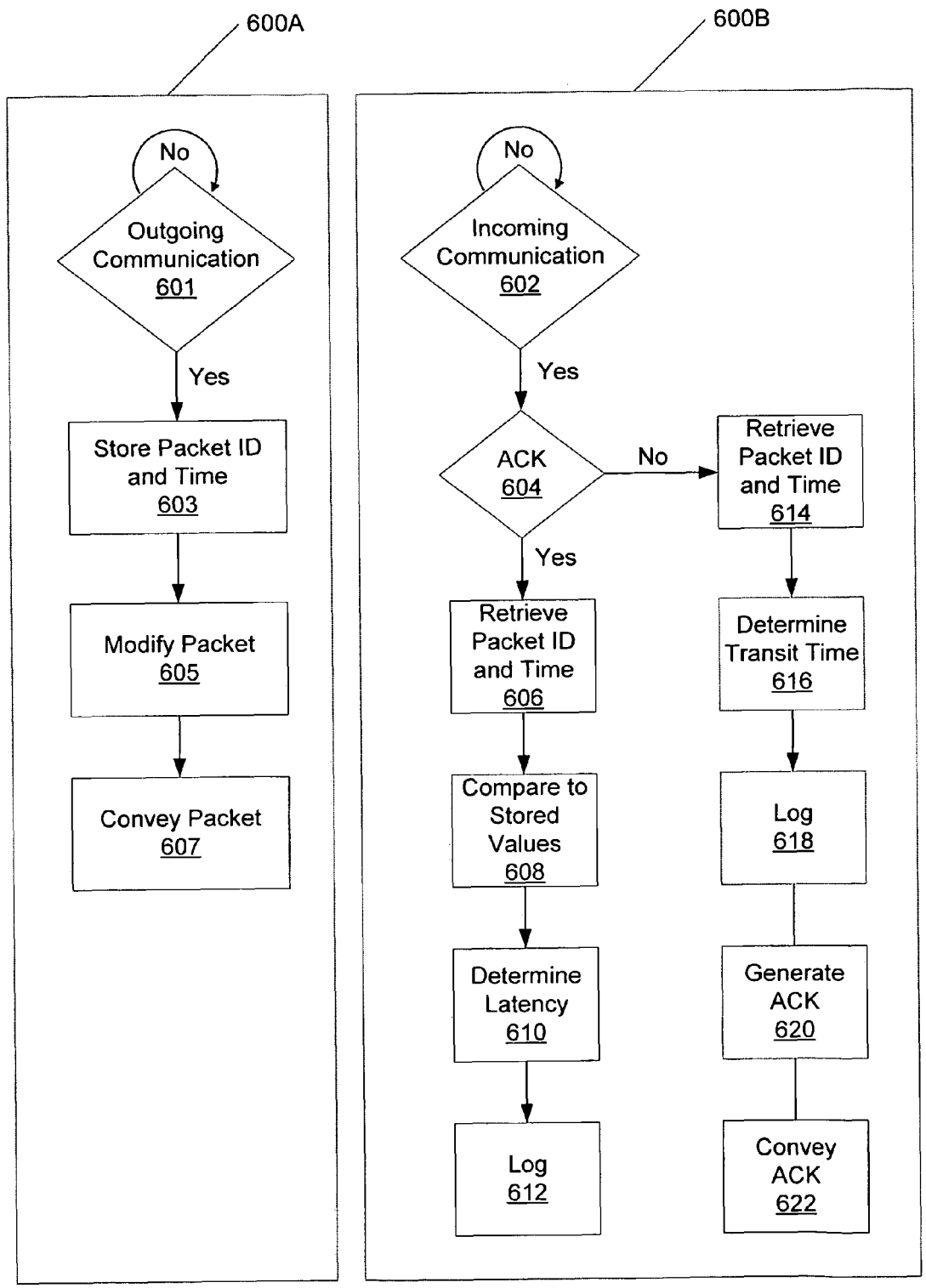
FIG. 6 illustrates one method for monitoring network performance.

Turning now to FIG. 6, one embodiment of a method according to the above described monitoring system is illustrated. The processing indicated in FIG. 6 may generally correspond to a network communication manager 214 as depicted in FIG. 3. A first sequence of blocks 600A is shown which generally corresponds to an outgoing communication from a system or host. A second sequence of blocks 600B generally corresponds to processing which may occur for received communication packets. Each of the sequences 600A and 600B may generally occur on either or both of an initiating and receiving system.

In the first sequence 600A, an outgoing communication may be detected (decision block 601). Such a communication may, for example, be initiated by an application such as application 214 in FIG. 2. A time stamp and packet ID may then be stored within one or more of the communication packets (block 403) by modifying the packet (block 405). In one embodiment, the packet ID and time stamp may also be stored separately in a local data structure for use in subsequent processing and analysis of packet transit times. Finally the packet is conveyed (block 407).

The second sequence 600B illustrates an incoming communication packet may be detected (decision block 602). If an incoming packet is detected, a determination may be made as to whether the received packet is an acknowledgement to a previously sent communication (decision block 604). If the received packet is an acknowledgement type packet, corresponding time information is retrieved. In an embodiment wherein the acknowledgement packet also includes time stamp information, the time stamp information and packet ID information are extracted from the acknowledgement packet (block 606) and compared to the values stored for the corresponding previously sent communication (block 608). By comparing the time stamp of the acknowledgement to the time stamp of the original communication, the transit latency of the original communication may be determined (block 610). The determined latency information may then be stored (block 612). In addition to the above, the time of receipt of the acknowledgement packet may be noted and compared to the time stamp stored within the acknowledgement packet. In this manner, the transit time of the acknowledgement packet may also be determined and logged if desired.

If, in decision block 604, it is determined the received packet is not an acknowledgement packet, the received packet may correspond to a packet received from an originating system or host. In such a case, the packet ID and time stamp information may be extracted from the received packet (block 614), the extracted time stamp information compared to the current time to determine the transit time (block 616), and the corresponding information logged (block 618). An acknowledgement to the received packet may then be generated and conveyed (blocks 620 and 622). Each of the generated acknowledgements may also include time stamp information indicating the time the acknowledgement packet was sent and/or generated. Time stamp information indicating the time the original packet was received by the acknowledger may also be included in the acknowledgement packet. It is noted that the sequence of events depicted in FIG. 6 may occur in a different order than that shown. Further, one or more of the activities shown may occur concurrently.

Figure 7:
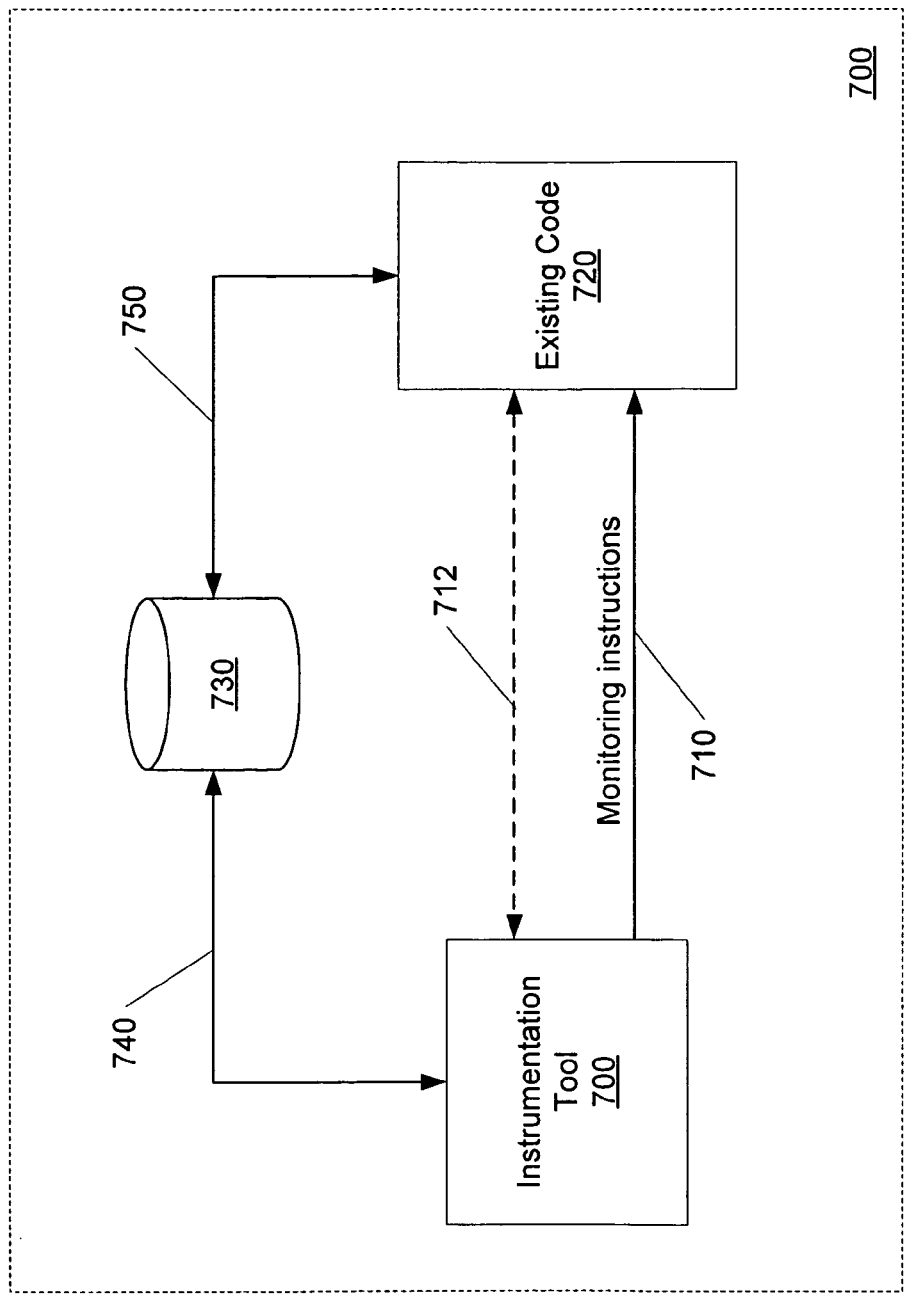
FIG. 7 depicts one embodiment of a system for instrumenting application code.

Finally, while a vendor may provide code such as the libraries 214 and 280 as shown in FIG. 2, an alternative approach involves modifying, or instrumenting, an existing piece of code to support the above described methods and mechanisms. FIG. 7 illustrates one embodiment of how application code may be instrumented to support the monitoring of network performance as discussed above. In the embodiment shown, a code instrumentation tool 700 is configured to perform instrumentation on existing code 720. Code instrumentation tool 700 may be a stand-alone software application or may be one module of a larger software tool that includes various performance monitoring functions. In some embodiments, code instrumentation tool 700 and code 720 may be executing on the same computing system. Alternatively, code instrumentation tool 700 and code 720 may execute on separate devices. For example, two computer systems connected through a local area network.

In one embodiment, code 720 may be Java application code, while in other embodiments, code 720 may be based on any of various types of software technologies including, but not limited to, C/C++, Oracle, SQL Server, DB2 UDB, J2EE application servers, web servers, storage servers, and so on.

Code instrumentation tool 700 may, in one embodiment, be configured to apply instrumentation to code 720 by inserting an initial set of instrumentation instructions in code 720 In addition to being configured to add new instrumentation instructions to code 720, code instrumentation tool 700 may also be configured to selectively enable or disable instrumentation instructions which are within code 720.

In certain embodiments, code instrumentation tool 700 may be configured to provide a user interface and allow a user to modify how code instrumentation tool 700 modifies the code 720. For example, code instrumentation tool 700 may allow a user to disable instrumentation of one or more modules in code 720. In some embodiments, code instrumentation tool 700 may be configured to adjust the instrumentation of runtime image 720 without reloading or restarting code 720.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

What is claimed is:

1. A method for monitoring network performance in a computing system, said method comprising:
    loading a user application in user space on a source system, the user application being configured to communicate with a destination system;

loading a non-external agent in the user space, in response to detecting loading of the user application, the non-external agent being configured to monitor network performance;

detecting a received communication packet along a communication path prior to the packet being conveyed via a network, said detecting being performed by the non-external agent along the communication path, and wherein said packet corresponds to non-diagnostic production traffic generated by the user application;

generating a modified packet by adding first time stamp information to the communication packet;

storing, separate from the received communication packet, an identifier and the first time stamp information corresponding to the received communication packet;

conveying, by the agent, the modified packet along the communication path via the network to the destination system;

receiving an acknowledgement packet corresponding to the modified packet, wherein the acknowledgement packet includes second time stamp information, the second time stamp information indicating a time the modified packet was received by the destination system;

retrieving the stored first time stamp information; and determining transit latency information corresponding to the communication packet, the transit latency information indicating a transit time of the modified packet from the source system to the destination system.

2. The method as recited in claim 1, wherein the storing and determining are performed by user application code.

3. The method as recited in claim 2, wherein determining the transit latency information comprises comparing the stored first time stamp information with the second time stamp information included in the acknowledgement packet.

4. The method as recited in claim 1, wherein said communication packet comprises a header field and a data field, the data field being configured to store original packet data from the communication packet, and wherein generating said modified packet comprises adding said time stamp information to the data field.

5. The method as recited in claim 1, wherein generating said modified packet further comprises adding a pseudo header to the data field, wherein said time stamp information is included in the pseudo header.

6. The method as recited in claim 5, wherein said pseudo header comprises a message type field, a message ID field, and a time field configured to store said time stamp information.

7. The method as recited in claim 5, wherein the communication packet corresponds to a particular process, and wherein the transit latency information includes an indication of said process.

8. A network computing system comprising:
a network infrastructure;
a first computing system comprising an application; and
a second computing system coupled to the first computing system via the network infrastructure;
wherein the first computing system is configured to:
load a user application in user space on the first computing system, the user application being configured to communicate with a the second computing system;
load a non-external agent in the user space, in response to detecting loading of the user application, the non-external agent being configured to monitor network performance;
detect a received communication packet along a communication path prior to the packet being conveyed via the network infrastructure, said detecting being performed by the non-external agent along the communication path, and wherein said packet corresponds to non-diagnostic production traffic generated by the user application;

generate a modified packet by adding first time stamp information to the communication packet;

store, separate from the outgoing communication packet, an identifier and the first time stamp information corresponding to the outgoing communication packet;

convey, by the agent, the modified packet along the communication path via the network infrastructure to the second computing system;

receive an acknowledgement packet corresponding to the modified packet, wherein the acknowledgement packet includes second time stamp information, the second time stamp information indicating a time the modified packet was received by the second computing system;

retrieve the stored first time stamp information; and determine transit latency information corresponding to the communication packet, the transit latency information indicating a transit time of the modified packet from the first computing system to the second computing system.

9. The system as recited in claim 8, wherein the first computing system is configured to store the identifier and determine the transit latency information by executing user application code.

10. The system as recited in claim 9, wherein the first computing system is configured to determine the transit latency information by comparing the stored first time stamp information with the second time stamp information included in the acknowledgement packet.

11. The system as recited in claim 9, wherein said communication packet comprises a header field and a data field, the data field being configured to store original packet data from the communication packet, and wherein generating said modified packet comprises adding said time stamp information to the data field.

12. The system as recited in claim 9, wherein generating said modified packet further comprises adding a pseudo header to the data field, wherein said time stamp information is included in the pseudo header.

13. The system as recited in claim 12, wherein said pseudo header comprises a message type field, a message ID field, and a time field configured to store said time stamp information.

14. The system as recited in claim 12, wherein the communication packet corresponds to a particular process, and wherein the transit latency information includes an indication of said process.

15. A computer readable storage medium comprising program instruction, said instructions being executable to:
load a user application in user space on a source system, the user application being configured to communicate with a destination system;
load a non-external agent in the user space, in response to detecting loading of the user application, the non-external agent being configured to monitor network performance;
detect a received communication packet along a communication path prior to the packet being conveyed via a network, said detecting being performed by the non-external agent along the communication path, and wherein said packet corresponds to non-diagnostic production traffic generated by the user application;

generate a modified packet by adding first time stamp information to the communication packet;

store, separate from the received communication packet, an identifier and the first time stamp information corresponding to the received communication packet;

convey, by the agent, the modified packet along the communication path via the network to the destination system;

receive an acknowledgement packet corresponding to the modified packet, wherein the acknowledgement packet includes second time stamp information, the second time stamp information indicating a time the modified packet was received by the destination system;

retrieve the stored first time stamp information; and determine transit latency information corresponding to the communication packet, the transit latency information indicating a transit time of the modified packet from the source system to the destination system.

16. The computer readable storage medium as recited in claim 15, wherein the storing and determining are performed by user application code.

17. The computer readable storage medium as recited in claim 16, wherein the user application code is included in a dynamic linked library.

18. The computer readable storage medium as recited in claim 16, wherein determining the transit latency information comprises comparing the stored first time stamp information with the second time stamp information included in the acknowledgement packet.

19. The computer readable storage medium as recited in claim 15, wherein said communication packet comprises a header field and a data field, the data field being configured to store original packet data from the communication packet, and wherein generating said modified packet comprises adding said time stamp information to the data field.

20. The computer readable storage medium as recited in claim 15, wherein generating said modified packet further comprises adding a pseudo header to the data field, wherein said time stamp information is included in the pseudo header.

* * * * *